US012731725B2

(12) United States Patent
Huang et al.

(10) Patent No.: US 12,731,725 B2
(45) Date of Patent: Sep. 8, 2026

(54) TWISTED-CORE TYPE LOW-PROFILE COUPLED INDUCTOR

(71) Applicant: Analog Devices, Inc., Wilmington, MA (US)

(72) Inventors: Zhengrong Huang, San Jose, CA (US); Jindong Zhang, San Jose, CA (US); Zichen Miao, Sunnyvale, CA (US)

(73) Assignee: Analog Devices, Inc., Wilmington, MA (US)

(*) Notice: Subject to any disclaimer, the term of this patent is extended or adjusted under 35 U.S.C. 154(b) by 866 days.

(21) Appl. No.: 18/061,302

(22) Filed: Dec. 2, 2022

(65) Prior Publication Data

US 2023/0253144 A1 Aug. 10, 2023

Related U.S. Application Data

(60) Provisional application No. 63/306,829, filed on Feb. 4, 2022.

(51) Int. Cl.
*H01F 27/28* (2006.01)
*H01F 27/26* (2006.01)
(Continued)

(52) U.S. Cl.
CPC ......... *H01F 27/306* (2013.01); *H01F 27/263* (2013.01); *H01F 41/0206* (2013.01); *H01F 41/06* (2013.01)

(58) Field of Classification Search
CPC .. H01F 27/306; H01F 27/263; H01F 41/0206; H01F 41/06; H01F 19/04;
(Continued)

(56) References Cited

U.S. PATENT DOCUMENTS

2013/0099886 A1* 4/2013 Yan ...................... H01F 27/303 336/192
2013/0113596 A1* 5/2013 Li ............................ H01F 3/00 336/212
(Continued)

FOREIGN PATENT DOCUMENTS

JP 2016066720 A 4/2016

OTHER PUBLICATIONS

"European Application Serial No. 23151418.3, Response Filed Jan. 17, 2024 to Extended European Search Report mailed Jul. 5, 2023", 22 pgs.

(Continued)

*Primary Examiner* — Shawki S Ismail
*Assistant Examiner* — Kazi S Hossain
(74) *Attorney, Agent, or Firm* — Schwegman Lundberg & Woessner, P.A.

(57) ABSTRACT

A device may include a coupled inductor structure comprising a first winding portion, a second winding portion, and a magnetic core structure. The magnetic core structure may include a first and second core piece that are at least partially cross-sectionally U-shaped. A first connecting core piece may be attached to a first portion of the first core piece to a first portion of the second core piece, and a second connecting core piece may attach a second portion of the first core piece to a second portion of the second core piece.

11 Claims, 13 Drawing Sheets

(51) Int. Cl.
*H01F 27/30* (2006.01)
*H01F 41/02* (2006.01)
*H01F 41/06* (2016.01)

(58) Field of Classification Search
CPC ......... H01F 27/2847; H01F 2027/2861; H01F 3/14; H01F 27/292; H01F 3/10
USPC ................................ 336/192, 200, 232, 198
See application file for complete search history.

(56) References Cited

U.S. PATENT DOCUMENTS

2015/0109086 A1* 4/2015 Won .......................... H01F 3/08
336/212
2018/0350515 A1* 12/2018 Okamoto .............. H01F 27/402
2021/0407729 A1* 12/2021 Yan ......................... H01F 41/04

OTHER PUBLICATIONS

"CL0608: Multi-phase power inductors", Technical Data 10578, Eaton, (2016), 4 pgs.
"European Application Serial No. 23151418.3, Extended European Search Report mailed Jul. 5, 2023", 11 pgs.
"LTM4700: Dual 50A or Single 100A pModule Regulator with Digital Power System Management", Analog Devices, Inc., (2021), 126 pgs.
Dong, Yan, et al., "Investigation of Multiphase Coupled-Inductor Buck Converters in Point-of-Load Applications", Ph.D. Dissertation, Virginia Tech, (2009), 332 pgs.
Jiang, Shuai, et al., "Driving 48V Technology Innovations Forward-Hybrid Converters and Trans-Inductor Voltage Regulator (TLVR)", industry session, Thirty-Fourth Annual IEEE Applied Power Electronics Conference and Exposition (APEC 2020), (2020), 16 pgs.
Wong, Pit-Leong, et al., "Investigating coupling inductors in the interleaving QSW VRM" Fifteenth Annual IEEE Applied Power Electronics Conference and Exposition (APEC 2000), vol. 2, (2000), 973-978.

* cited by examiner

TWISTED-CORE TYPE LOW-PROFILE COUPLED INDUCTOR

CLAIM OF PRIORITY

This application claims the benefit of priority to U.S. Provisional Patent Application Ser. No. 63/306,829, filed Feb. 4, 2022, which is hereby incorporated by reference herein in its entirety.

TECHNICAL FIELD

The present disclosure relates to inductor structures, specifically to coupled inductor structures of a twisted core type and including gaps for independently controlling magnetizing and leakage inductances of the coupled inductor structure.

BACKGROUND

As electronic devices become smaller, there is less room for the circuit components on the circuit boards contained in the devices. Power converters such as multi-phase buck converters are used in a wide variety of electronic devices such as battery chargers, power audio amplifiers, and the like. Switched mode power converters can use inductors to provide stable current to the load as a pulse-width modulation (PWM) or other control signal operates a bridge or other configuration of switches coupled to the inductor. Inductors can be coupled or non-coupled. Coupled inductors have two or more windings on the same core, which takes advantage of magnetic coupling to influence the behavior of each winding on the other. Non-coupled or uncoupled discrete inductors use two or more cores with a single winding on each core. Coupled inductors can be used for increasing or decreasing voltage or current, for transferring impedance through a circuit, or for electrically isolating two circuits from each other, while taking up less space on the circuit board.

SUMMARY

The present techniques relate to a device including an inverse coupled inductor. The inverse coupled inductor can use a core structure with a flux pattern like that of a twisted core structure (e.g., mimics or acts like a twisted core structure), without actually requiring forming a twisted core. The device can include multiple magnetic core pieces formed from a ferromagnetic material such as iron, ferrite, or any similar material. The core structure can be assembled such that the completed structure takes the shape of a substantially rectangular block. The windings (e.g., staple windings) or portions of windings can be surrounded by, embedded in, or can otherwise be included in at least a portion of the core structure. For example, the magnetic core pieces can be assembled such as to form a core structure into which one or more winding portions can be at least partially inserted, such as through slots in the sides of the assembled core structure.

A device including an inverse-coupled inductor can include a first straight winding portion located on a first plane, along a first linear axis and a second straight winding portion located on a second plane, parallel to the first plane along a second linear axis parallel to the first linear axis. The assembled core structure can be a substantially rectangular block forming a magnetically closed-loop around the first and second straight winding portions. The assembled core structure can encircle one of the first straight winding portion or the second straight winding portion in a clockwise direction and encircle the other of the first straight winding portion or the second straight winding portion in a counter-clockwise direction.

The core structure can include a first zig-zag shaped gap, generating a first clearance between at least two portions of the closed-loop magnetic core structure, located above the first straight winding portion and the second straight winding portion, and a second zig-zag shaped gap generating a second clearance between at least two other portions of the closed-loop magnetic core structure located below the first straight winding portion and the second straight winding portion. The first zig-zag shaped gap can include a first straight portion located above the first straight winding portion extending parallel to the first linear axis and have a length approximately half of the first straight winding portion. The first zig-zag shaped gap can further include a second straight portion, located above the first straight winding portion and the second straight winding portion extending from above an approximate center point of the first straight winding portion to above an approximate center point of the second straight winding portion. The first zig-zag shaped gap can also include a third straight portion, located above the second winding portion, extending parallel to the second linear axis, and having a length approximately half of the second straight winding portion.

The second zig-zag shaped gap can include a first straight portion, located below the first straight winding portion, extending parallel to the first linear axis, and having a length approximately half of the first straight winding portion. The second zig-zag shaped gap can also include a second straight portion, located below the first straight winding portion and the second straight winding portion, extending from below an approximate center point of the first straight winding portion to below an approximate center point of the second straight winding portion. Finally, the second zig-zag shaped gap can include a third straight portion, located below the second straight winding portion, extending parallel to the second linear axis, and having a length approximately half of the second straight winding portion.

The closed-loop magnetic core structure may further include at least one straight gap along the closed-loop path, with a cross section of every straight gap located so as to be normal to the closed-loop path. The straight gap or gaps can be formed or designed to be sufficiently smaller than each clearance, width, or thickness generated by the zig-zag shaped gaps, such that the coupling coefficient of the inverse coupled inductor structure is at least 0.6.

The pieces of the magnetic core structure may include two at least partially cross-sectionally U-shaped core pieces (when viewed along the linear axes), and two connecting core pieces that attach to the U-shaped core pieces. The connecting core pieces may include a step-structure (e.g., shaped like a “Z” when viewed from the side), or a block structure (e.g., shaped like a three-dimensional square or rectangle when viewed from the side). Alternatively, the pieces of the magnetic core structure may include one or several “L-shaped” pieces (when viewed from above) with grooves or slots etched or cut into them into which the winding portions can be laid or otherwise located. For example, the magnetic core structure may include two L-shaped “bottom” pieces, and two L-shaped “top” pieces, with the winding portions located between the top pieces and the bottom pieces. The U-shaped core pieces can encircle the winding portions by at least 180 degrees. The connecting core pieces can attach the ends of the first and second core pieces and pass through the first and second planes at a location between the first and second straight winding portions.

The assembled core structure (to be used interchangeably with the terms "coupled inductor structure", "closed-loop magnetic core structure", "assembled structure", or "inductor structure") may include one or more gaps formed between the various core pieces. For example, a first gap formed between at least one of the connecting core pieces and at least one of the U-shaped core pieces may control the leakage inductance of the inverse coupled inductor. Additionally, or alternatively, a second gap formed between at least one of the connecting core pieces and at least one of the U-shaped core pieces may control the mutual inductance of the inverse coupled inductor.

The assembled structure may use a substantially or a completely flat top surface area, which may aid working with pick-and-place machines and may enhance mechanical robustness. In addition, terminal ends of the windings can be located such that switch node terminals (e.g., $SW_1$ and $SW_2$) can be located on one side of the inductor structure and the output voltage terminals (e.g., $V_{OUT1}$ and $V_{OUT2}$) can be located on the other side of the inductor structure. Locating the switch node terminals on one side of the assembled structure and the output voltage terminals on the other side may simplify the integrating or coupling of the inductor structure to surrounding circuitry (e.g., a power stage or a controller of a power converter) of a device including the inductor structure.

Thus, the inductor structure can include a first core piece extending from a first end to a second end, crossing over the first straight winding portion at a location between two ends of the first straight winding portion. The inductor structure can further include a second core piece, magnetically connected to the second end of the first core piece. The second core piece can extend from a first end to a second end, having a portion crossing under the second straight winding portion at a location between two ends of the second straight winding portion. The inductor structure can also include a third core piece magnetically connected to the second end of the second core piece. The third core piece can extend from a first end to a second end and cross over the second straight winding portion at a location between the two ends of the second straight winding portion. The inductor structure can include a fourth core piece connected to the second end of the third core piece. The fourth core piece can extend from a first end to a second end and include a portion that crosses under the first straight winding portion at a location between the ends of the first straight winding portion. The fourth core piece can connect to the first end of the first core piece to close the loop. The first winding portion can be located in a first slot in the inductor structure formed between the attached first core piece, the second core piece and the fourth core piece. The second winding portion can be located in a second slot in the inductor structure formed between the attached second core piece, the third core piece and the fourth core piece. The assembled inductor structure, when all of the core pieces are attached, can be substantially L-shaped when viewed from a direction normal to the first plane and the second plane.

Assembling the magnetic core structure can include providing the first core piece, attaching the first end of the second core piece to the second end of the first core piece, attaching the first end of the third core piece to the second end of the second core piece, attaching the first end of the fourth core piece to the second end of the third core piece, and attaching the second end of the fourth core piece to the first end of the first core piece.

The inverse coupled inductor structure may help reduce the winding length and the DC resistance (DCR), which may help reduce or minimize the winding loss of the inverse-coupled inductor structure. The gap locations, layout, or structure may allow for easy and independent control of mutual and leakage inductance such as by controlling the sizes of each of the gaps. For example, a clearance generated by the first and second zig-zag shaped gaps can be designed to control leakage inductance of the inverse-coupled inductor. Additionally, or alternatively, a length of the at least one straight gap can be designed to control mutual inductance of the inverse-coupled inductor. The two zig-zag shaped gaps can span an entire width of the magnetic core structure and the at least one straight gap can span at least approximately half the width of the magnetic core structure.

The inverse-coupled inductor structure may have a smaller or lower height compared to other inductor structures, which may reduce the profile of an entire power module in which the inverse-coupled inductor structure is included. A lower profile of the power module may also help reduce the overall size of an electronic device in which the inductor is included. Finally, at least a portion of the windings, which may be formed from copper or a material with similar properties (e.g., electrical conductivity, ohmic resistance, or the like) as copper, may be shielded by the magnetic core of the inverse-coupled inductor. Shielding the windings with the magnetic core may have the benefit of reducing or lowering Electromagnetic Interference (EMI) caused by the windings or otherwise aiding in the overall noise reduction of the inductor structure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
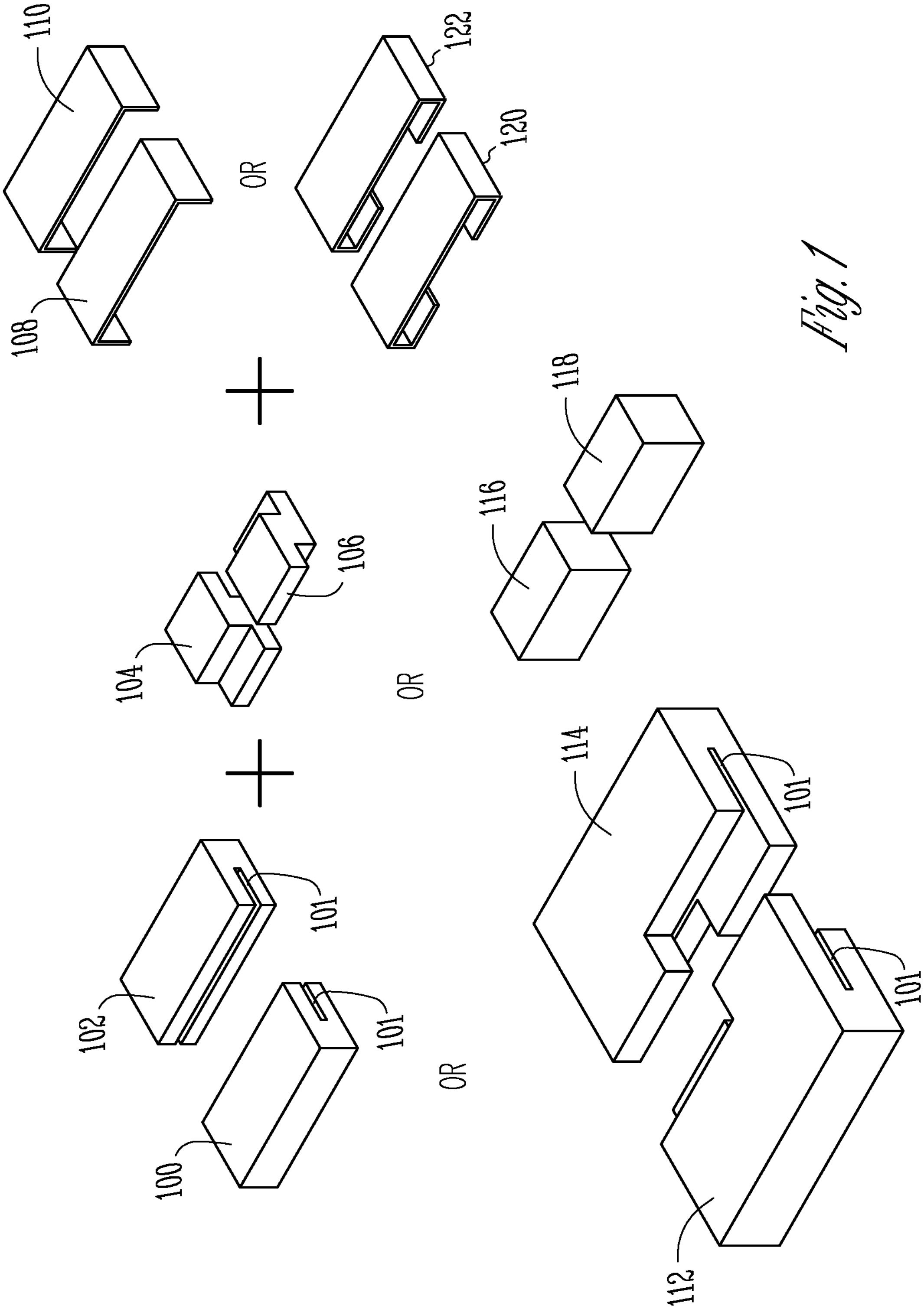
FIG. 1 illustrates example components that can be assembled to form a twisted-core type coupled inductor structure.

Power converters in low-voltage high-current point-of-load (POL) applications should provide high efficiency and fast load transient response. A multi-phase buck converter is an example of a topology in such power conversion applications. Where discrete (non-coupled) inductors are used in the multi-phase buck converter, the above two objectives of high efficiency and fast load transient response are in conflict. A larger inductance may be utilized in each phase of the converter to decrease the inductor current ripple in each phase, which also reduces conduction related losses and thereby improves efficiency. Using larger inductance, however, can increase transient response time of the converter and can result in more severe overshoot and undershoot of the output voltage where a fast load transient occurs.

Instead of non-coupled inductors, inverse coupled inductors may be used in power converters such as multi-phase buck converters to improve performance. The present subject matter is directed to a low-profile dual-phase inverse coupled inductor structure having a core structure with a flux pattern like that of a twisted core structure, that can be used for POL applications. Thus, the core structure can mimic or act like a twisted core structure, with potential advantages such as having switch node terminals on the same side of the inductor structure and output voltage terminals on the opposite side of the inductor structure from the switch node terminals. The location of the switch node terminals on a single side of the inductor structure and the output voltage terminals on the side opposite the switch node terminals may help simplify integrating or coupling the inductor to surrounding circuitry such as a power stage and controller for a system including the coupled inductor.

The inverse coupled inductor structure may include a dual gap configuration, layout, design, or structure for independently controlling the leakage and mutual inductances of the coupled inductor structure. One gap or set of gaps of the core structure may control the mutual inductance of the coupled inductor while another gap or set of gaps may control the leakage inductance of the coupled inductor. Because the mutual and leakage inductance can be controlled independently by the dual gap configuration, the design of the coupled inductor structure may be simplified as compared with other inductor designs in which leakage inductance and mutual inductance are controlled in conjunction with each other.

The low-profile twisted core coupled inductor of the present subject matter has good space utilization and a relatively large top surface area, which is good for working with pick-and-place machines and enhances the mechanical robustness. Furthermore, the coupled inductor structure may use straight windings (e.g., staple windings) which may help minimize the winding length and thereby help reduce the DC resistance (DCR), which is beneficial to minimizing the winding loss of the coupled inductor. Finally, most parts of the copper windings can be shielded by the magnetic core, which is beneficial to EMI noise reduction.

FIG. 1 illustrates an example of components that can be assembled to form a twisted-core type coupled inductor structure. As illustrated in FIG. 1, the components of the coupled inductor structure may include a first core piece 100 and a second core piece 102. The first core piece 100 and/or the second core piece 102 may be at least partially cross-sectionally U-shaped, meaning at least one of the first core piece 100 or second core piece 102 may include a slit 101 cut in a portion of the core pieces such as from one side of the core pieces to the other side, so that the core pieces look like a “U” with a square bottom when viewed cross-sectionally. Alternatively, the core pieces may have a modified U-shape, such as illustrated by modified first core piece 112 and modified second core piece 114. The modified first core piece 112 and/or the modified second core piece 114 may have a portion above the slit 101 on one side of the core piece and a portion below the slit 101 on the other side of the core piece cut out, removed, or the like.

The components of the coupled inductor structure may further include one or more connector pieces such as a first step-shaped connector piece 104, a second step-shaped connector piece 106, or alternatively, a first block-shaped connector piece 116 or a second block-shaped connector piece 118. The connector pieces may be used to connect the core pieces together. For example, the first step-shaped connector piece 104 may attach a first portion of the first core piece 100 to a first portion of the second core piece 102. Likewise, the second step-shaped connector piece 106 may attach a second portion of the first core piece 100 to a second portion of the second core piece 102. Similarly, the first block-shaped connector piece 116 may connect a first portion of the modified first core piece 112 to a first portion of the modified second core piece 114. The second block-shaped connector piece 118 may connect a second portion of the modified first core piece 112 to a second portion of the modified second core piece 114.

The components of the inductor structure may also include one or more windings, such as windings 108, 110, 120, or 122 (collectively, “the windings”). For example, the windings may include a staple winding such as first staple winding 108 and second staple winding 110 and may have terminal ends that are substantially straight so as to be part of a through-hole package (collectively “through-hole Windings”). Thus, the inductor structure can be mounted on a circuit board such as by inserting the terminal ends through a hole on the circuit board and soldering the terminal ends in place. Alternatively, the terminal ends of the windings may be bent, twisted, or folded. This can help to enable the inductor structure to be assembled in a surface mount device (collectively “surface mount windings”) as shown by first surface mount winding 120 and second surface mount winding 122. The windings may be inserted into the coupled inductor structure either during or after assembly of the core pieces and connector pieces such as in slots formed between the core pieces and/or the connector pieces.

Figure 2A:
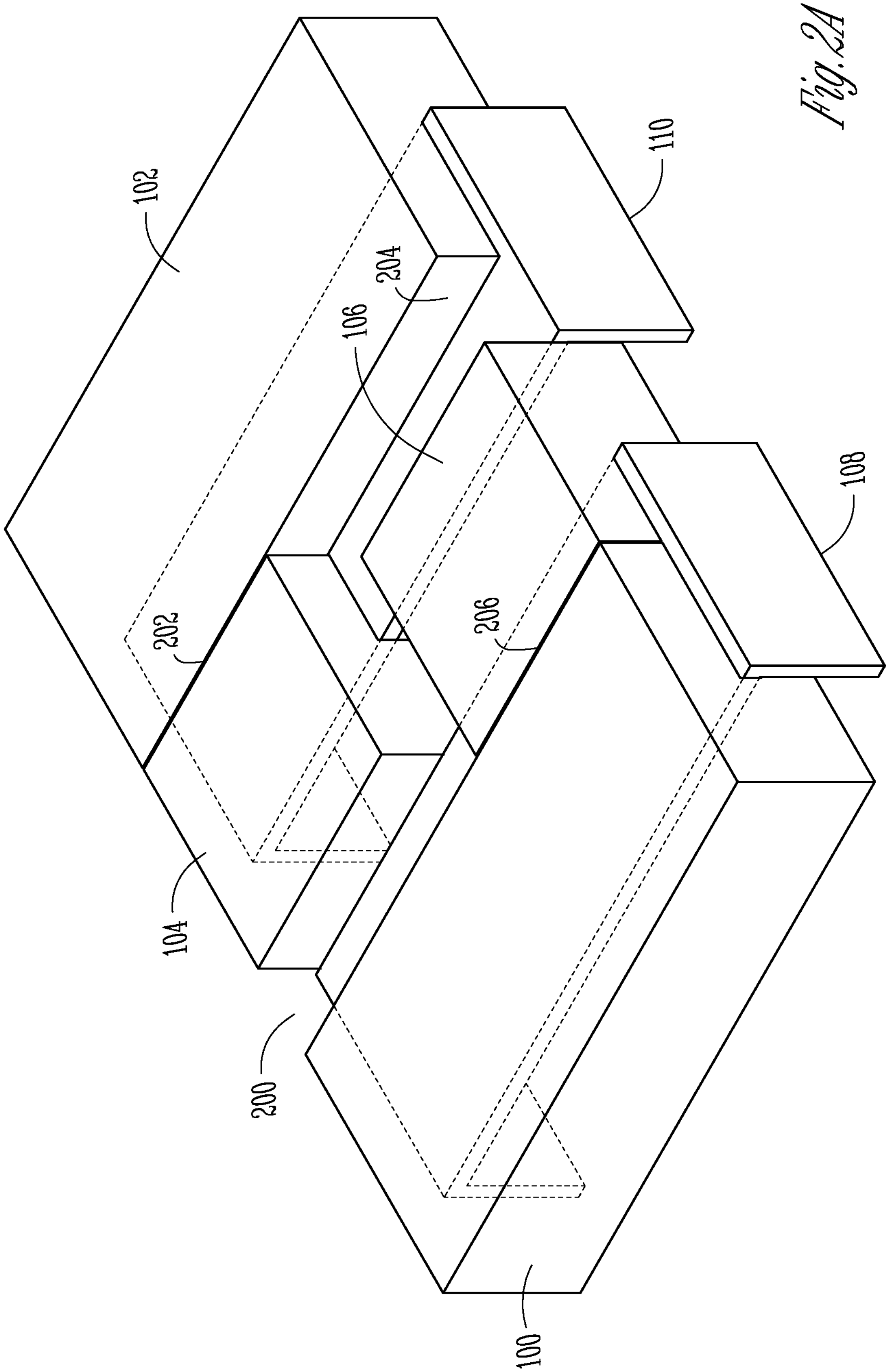
FIGS. 2A-2D show different views of the assembled coupled inductor structure with the windings inserted into the assembled core and illustrating the location of the gaps in the assembled coupled inductor structure.

FIGS. 2A-2D show different views of the assembled coupled inductor structure with the windings inserted into the assembled core and illustrating the location of the gaps in the assembled coupled inductor structure. FIG. 2A shows an example in which the first core piece 100 may be connected to the second core piece 102 by the first step-shaped connector piece 104 and the second step-shaped connector piece 106. A lower portion of the first step-shaped connector piece 104 may connect to a lower portion of the first core piece 100 and an upper portion of the first step-shaped connector piece 104 may connect to an upper portion of the second core piece 102. Similarly, an upper portion of the second step-shaped connector piece 106 may connect to an upper portion of the first core piece 100 and a lower portion of the second step-shaped connector piece 106 may connect to a lower portion of the second core piece 102.

The connector pieces may be connected to the core pieces in such a way to form a first gap 200 between the first step-shaped connector piece 104 and the first core piece 100. A corresponding first gap 204 may be formed between the second step-shaped connector piece 106 and the second core piece 102. The first gap 200 and the corresponding first gap 204 may, in combination cross or span an entire width of the core structure and help control the leakage inductance of the assembled coupled inductor structure. Furthermore, a second gap 202 may be formed or located between the first step-shaped connector piece 104 and the second core piece 102 and a corresponding second gap 206 may be formed or located between the second step-shaped connector piece 106 and the first core piece 100. In an example, each of the second gap 202 and the corresponding second gap 206 may span or cross approximately half the width of the core structure and may help control the magnetizing or mutual inductance of the assembled coupled inductor structure. The first gap 200 and the corresponding first gap 204 may have the same width or thickness, and the second gap 202 and the corresponding second gap 206 may have the same width or thickness, which may be smaller than the width of the first gap 200 and the corresponding first gap 204. Stated differently, the width of the first gap 200 and the corresponding first gap 204 may be larger than the width of the second gap 202 and the corresponding second gap 206.

Figure 2B:
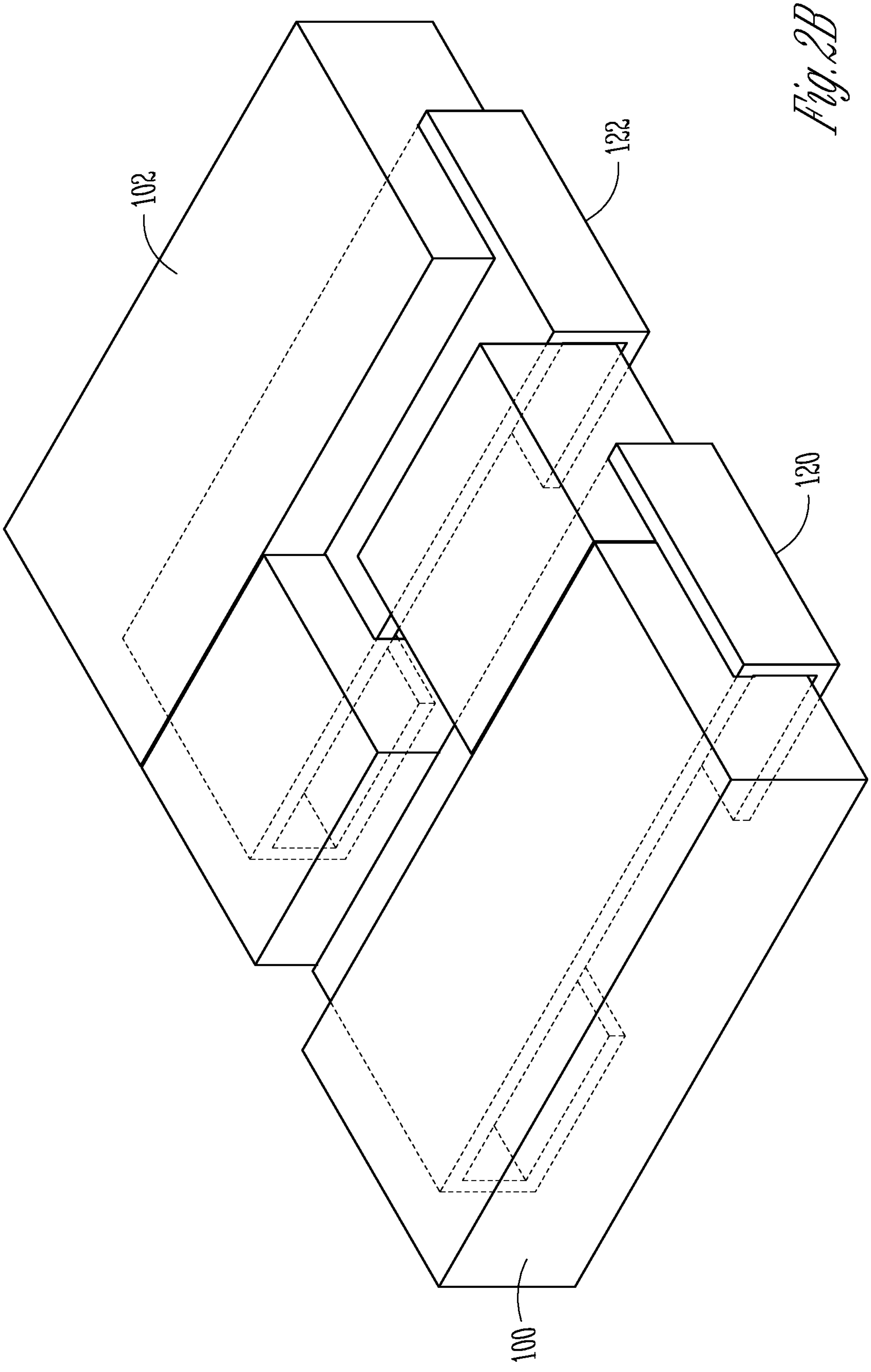

The windings may be inserted into the assembled conductor structure either as the core pieces and the connector pieces are being assembled (e.g., during a fabrication of the inductor structure) or inserted into slots, openings, or the like, such as slit 101 in the first core piece 100 and/or the second core piece 102. FIG. 2A shows the staple windings 108 and 110, with the straight terminal ends as described above. FIG. 2B shows an option in which the surface mount windings 120 and 122 may be used in the assembled inductor structure. The assembled inductor structure may allow for two current excitations $iL_1$ and $iL_2$ across the windings, which may flow in the same direction across the windings. The terminal ends of the windings may form two switch node terminals, $SW_1$ and $SW_2$. $SW_1$ may be formed by a terminal end of the first staple winding 108 and $SW_2$ may be formed by a terminal end of the second staple winding 110. The two switch node terminals may be located on the same side of the assembled coupled inductor structure. Similarly, two output voltage terminals, $V_{OUT1}$ and $V_{OUT2}$ may be formed by the opposite ends of the terminal windings on the opposite side of the assembled coupled inductor structure from the switch node terminals. For example, $V_{OUT1}$ may be formed by the opposite terminal end of the first staple winding 108, and $V_{OUT2}$ may be formed by the opposite terminal end of the second stable winding 110. The terminal ends of the surface mount windings may form a similar arrangement as illustrated in FIG. 2B.

Figure 2C:
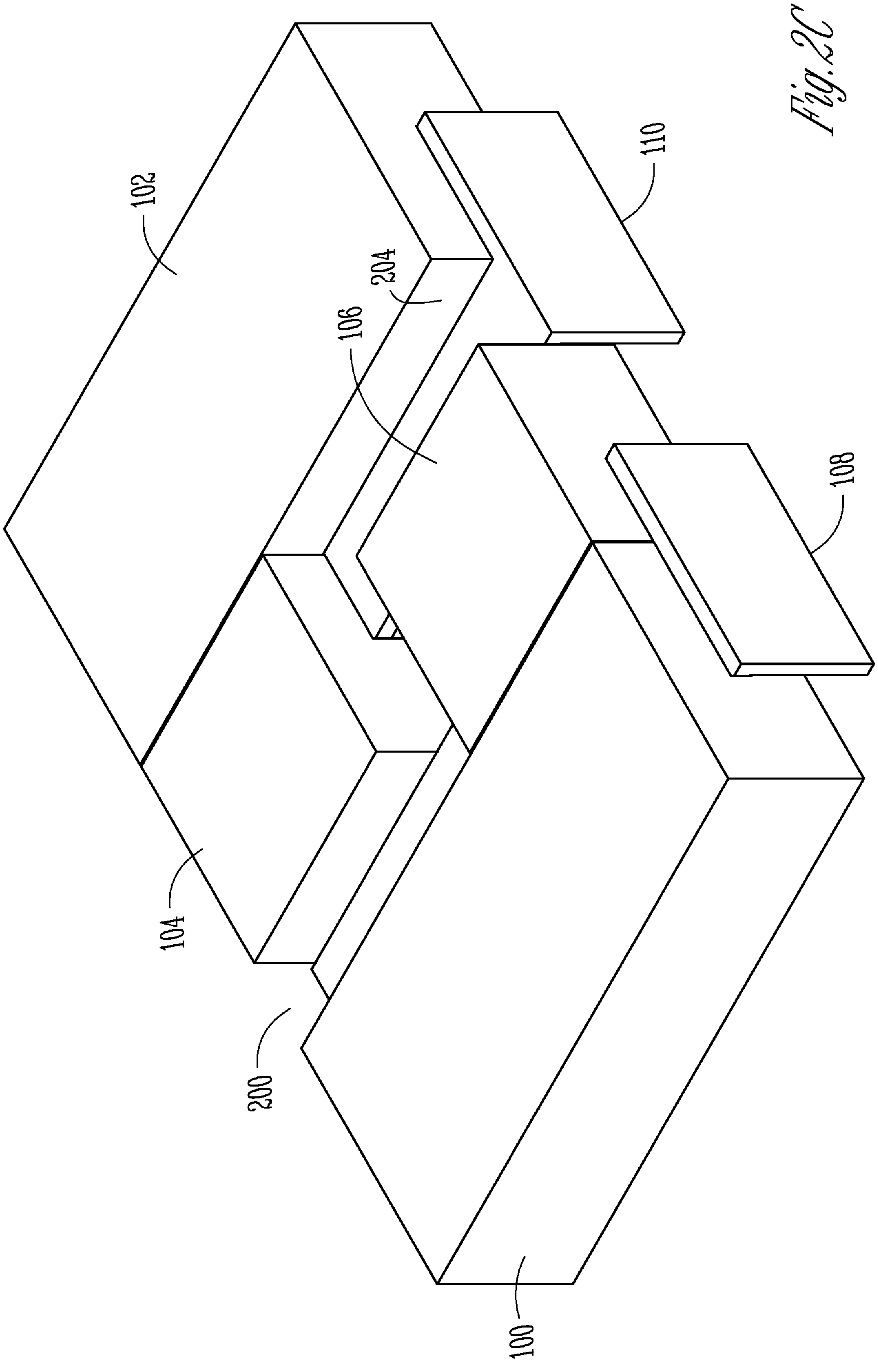

FIG. 2C illustrates an alternate view of the assembled coupled inductor structure as seen from above showing how the windings are shielded by the core pieces and the connector pieces. As illustrated in FIG. 2C, the first staple winding 108 and the second staple winding 110 can be at least partially covered, surrounded, encased, or the like by the first core piece 100, the first step-shaped connector piece 104, the second core piece 102, and the second step-shaped connector piece 106. This may aid in shielding the windings and reduce the EMI of the windings. Further, as illustrated in FIG. 2C, when viewed from the top side, the first core piece 100 and the second step-shaped connector piece 106 when connected to each other may form a first "L-shaped" core piece. Similarly, the second core piece 102 and the first step-shaped connector piece 104 when connected to each other may form a second "L-shaped core" piece that is separated from the first L-shaped core piece by the first gap 200 and the corresponding first gap 204.

Figure 2D:
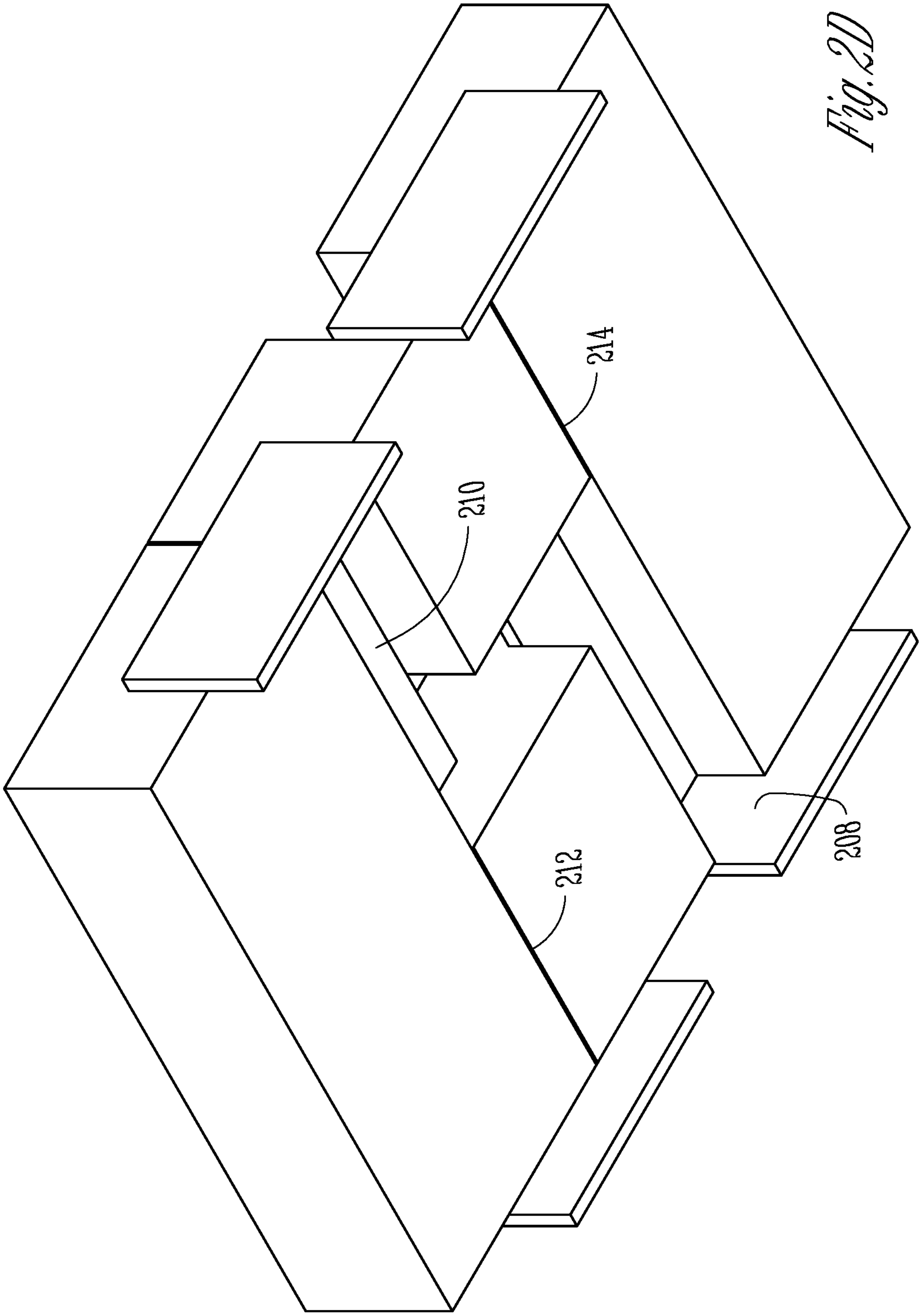

FIG. 2D illustrates a view of the underside of an assembled coupled inductor structure viewed from below. Like the top side of the assembled structure illustrated in FIGS. 2A-2C, the underside may include one or more gaps in similar locations or a similar configuration to the gaps on the top side of the structure. For example, the underside of the structure may include a third gap 208 and a corresponding third gap 210 between the connector pieces and the core pieces, the combination of which may span the entire width of the structure. This may help control the leakage inductance of the assembled coupled inductor structure like the first gap 200 and the corresponding first gap 204 on the top side of the core structure. The underside of the core structure may also include a fourth gap 212 and a corresponding fourth gap 214 between the connector pieces and the core pieces. The fourth gap 212 and the corresponding fourth gap 214 may each span approximately half of the underside of the core structure. This may help control the magnetizing or mutual inductance of the assembled coupled inductor structure as the second gap 202 and the corresponding second gap 206 do on the top side of the core structure. The fourth gap 212 and the corresponding fourth gap 214 may have a smaller width or be narrower than the third gap 208 and the corresponding third gap 210.

The assembled structure may have any number of gaps in any locations that are desired or suitable to control or adjust parameters such as the mutual inductance or the leakage inductance as discussed above. Furthermore, any of the gaps of the assembled structure may be filled with air, or an electrically non-conductive material such as glue, epoxy, paper, plastic or any material with a similar permeability to air. Finally, at least a portion of the windings, which may be formed from copper or a material with similar properties (e.g., electrical conductivity, ohmic resistance, or the like) as copper, may be shielded by the portions of the core structure as discussed above. The windings illustrated in FIGS. 2A-2D are staple windings, but the term "winding" as used herein may include a wire, the illustrated staple windings or another similar flat or other electrical conductor. The windings also may include, but is not limited to, a coil type winding.

Figure 3:
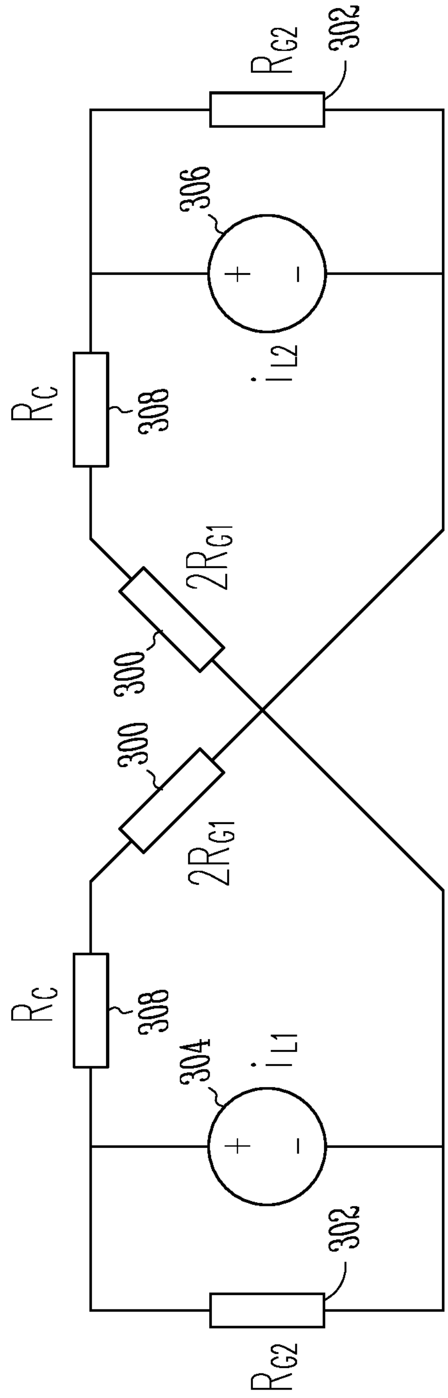
FIG. 3 illustrates an equivalent magnetic circuit diagram of the twisted-core type coupled inductor structure.

FIG. 3 illustrates an equivalent magnetic circuit diagram of the twisted-core type coupled inductor structure. FIG. 3 illustrates that the mutual inductance of the coupled inductor is controlled by a first reluctance 300 ($R_{G1}$), and the leakage inductance of the coupled inductor is controlled by a second reluctance 302 ($R_{G2}$). As mentioned above, the control of mutual inductance and the control of leakage inductance are independent, which may simplify the design of the inductor. A magnetomotive force (MMF) of two inductor current excitations $iL_1$ and $iL_2$ which are the current excitations across the windings as discussed above, are shown as the voltage sources 304 and 306. The second gap 202 and the corresponding second gap 206 and/or the fourth gap 212 and the corresponding fourth gap 214 (e.g., the gaps crossing about half of the core width) corresponds to the reluctance of the first reluctance 300 $R_{G1}$. The first gap 200 and the corresponding first gap 204 and/or the third gap 208 and the corresponding third gap 210 (e.g., the gaps spanning the entire core width) corresponds to the reluctance of the second reluctance 302 $R_{G2}$. The third reluctance 308 ($R_C$) corresponds to the reluctance of the magnetic core itself.

Figure 4A:
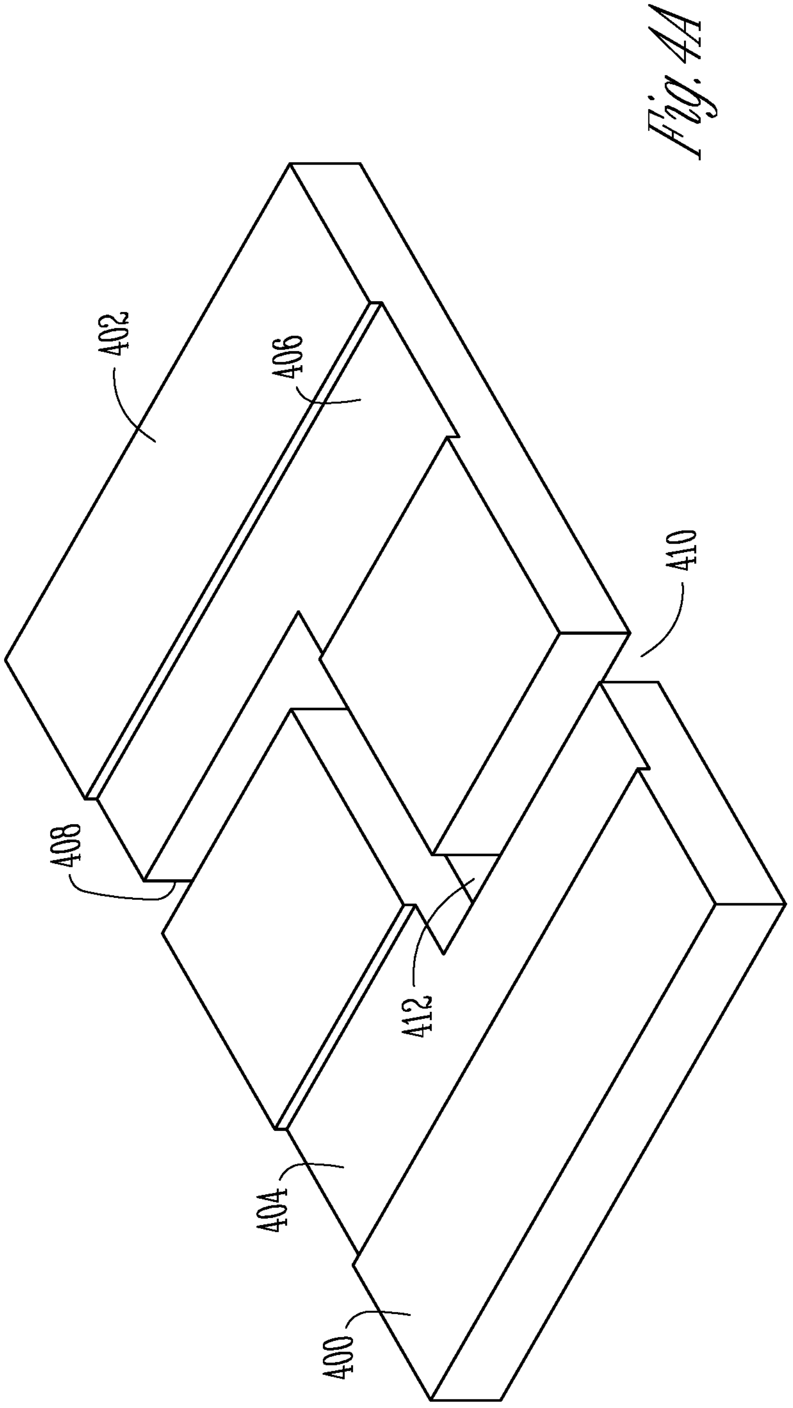
FIGS. 4A-4C illustrate different components of an alternate coupled inductor structure during a fabrication or assembly process.
Figure 4B:
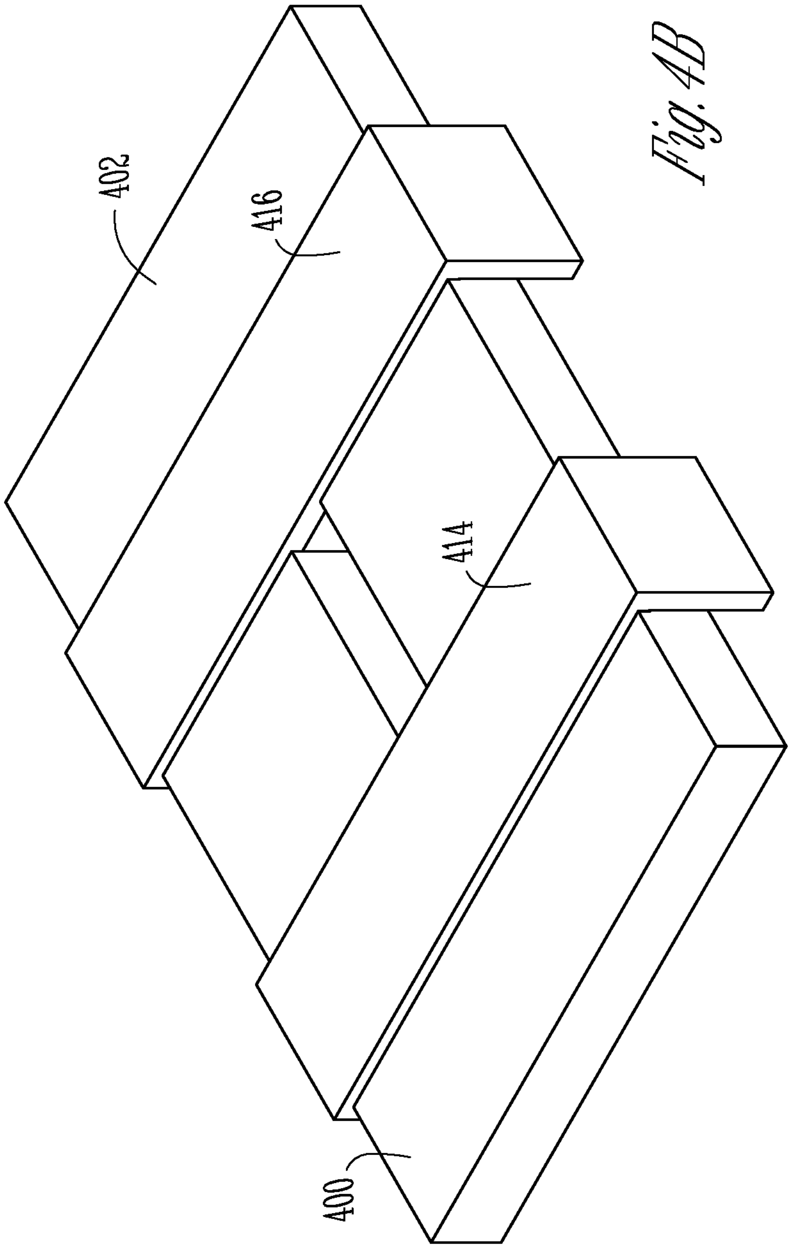
Figure 4C:
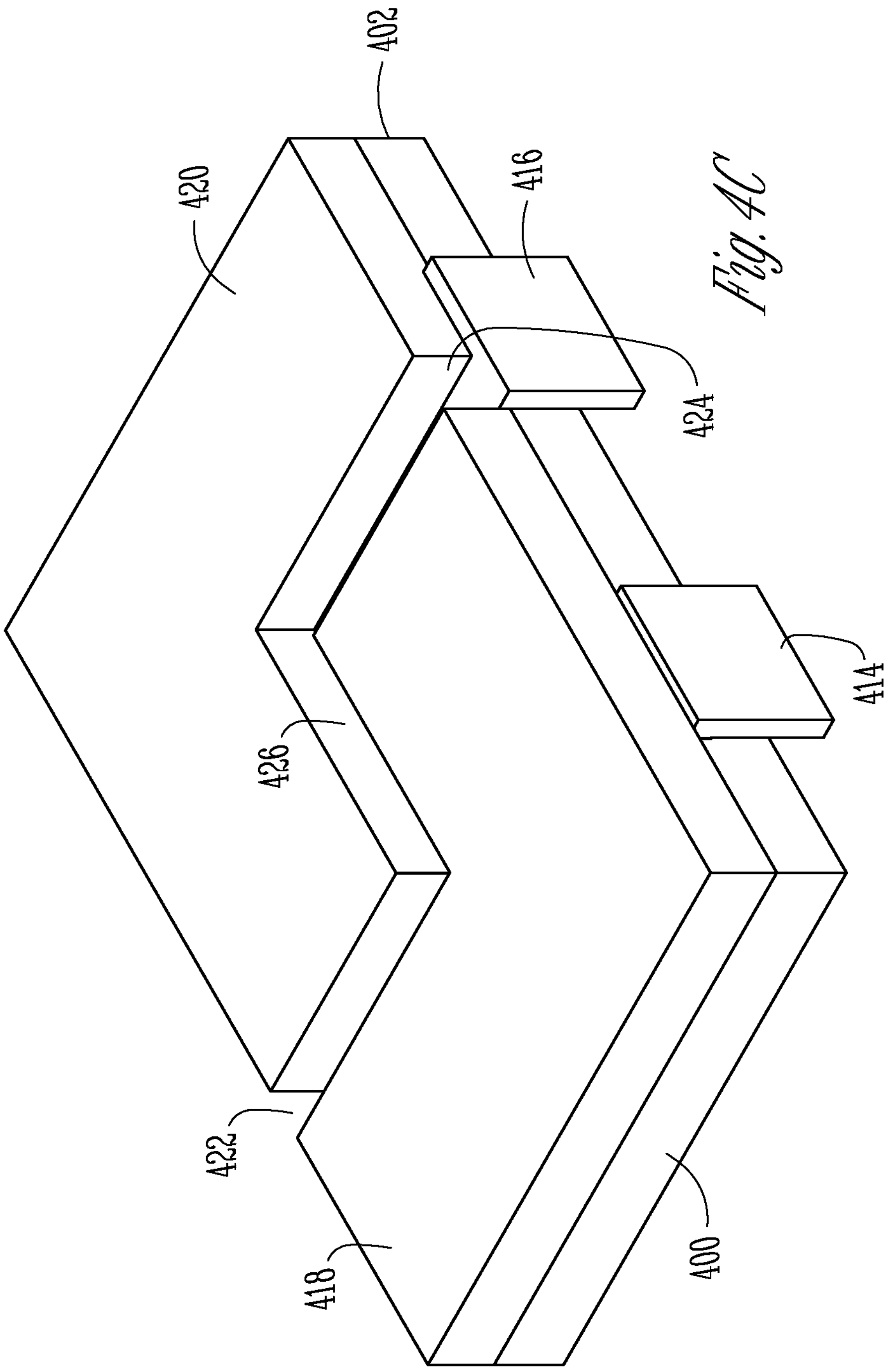

FIGS. 4A-4C illustrate different components of an alternate coupled inductor structure during a fabrication or assembly process. In the examples illustrated in FIGS. 4A-4C, instead of using two core pieces and connector pieces to assemble the coupled inductor structure, the core structure may be assembled using two bottom core pieces and two top core pieces with the windings located between the top and bottom core pieces. Thus, an alternate core structure may include a first bottom core piece 400 and a second bottom core piece 402. Each of the first bottom core piece 400 and the second bottom core piece 402 may be shaped like a capital "L" when viewed from above and arranged so that the two L-shaped pieces form a rectangular bottom of the core structure. The first bottom core piece 400 and the second bottom core piece 402 may be located so as to form a similar gap structure as discussed above, with a first bottom gap 408 and a corresponding first bottom gap 410 that spans across the width of the bottom of the core structure. As also illustrated in FIG. 4A, the first bottom gap 408 and the corresponding first bottom gap 410 may meet to form a center gap 412 to essentially form a zig-zag gap configuration between the two bottom core pieces. These gaps may be collectively referred to a "large bottom gap".

Each of the first bottom core piece 400 and the second bottom core piece 402 may include a slot, cavity, depression, void, or recess, cut or etched into a surface of the bottom core pieces. For example, first recess 404 may be cut into a surface of the first bottom core piece 400 and second recess 406 cut into a surface of the second bottom core piece 402. As illustrated in FIG. 4B, a first winding portion 414 may be located or placed into the first recess 404 on the first bottom core piece 400. Similarly, a second winding portion 416 may be located or placed into the second recess 406 on the second bottom core piece 402. The recesses may be located so that at least a portion of the first recess 404 and a portion of the second recess 406 may be substantially parallel to each other. This, in turn, may cause at least a portion of each winding to be substantially parallel to each other in the assembled alternate coupled inductor structure. Also, the recesses may be cut into the core pieces on any portion of the surface of the core pieces to control how far apart the windings are spaced in the assembled alternate coupled inductor structure. As discussed above, the term windings may refer to staple windings or a similar flattened electrical conductor, a wire, or any suitable portion of electrically conductive material such as copper, or any suitable material with properties similar to copper.

As illustrated in FIG. 4C, two top L-shaped core pieces, first top core piece 418 and second top core piece 420 may be located over the first winding portion 414 and the second winding portion 416. The top core pieces may be identical in size and shape to the bottom core pieces and may have one or more recesses cut or etched into their surfaces, as described for the bottom core pieces, to accommodate the winding portions. Thus, the alternate coupled inductor structure may have a similar shape as the inductor structures illustrated and described in FIGS. 2A-2D but lacking the connector pieces. The top core pieces may be arranged so as to have a first top gap 422 and a corresponding first top gap 424, and a top center gap 426 (collectively a "large top gap"), a size of which (e.g., a width or a thickness) may control a strength or amount of the leakage inductance of the alternate coupled inductor structure.

The alternate coupled inductor structure may include one or more additional gaps located around the sides or the ends of the structure, between the first bottom core piece 400 and the first top core piece 418 and/or the second bottom core piece 402 and the second top core piece 420. The additional gaps may be smaller (e.g., have a smaller thickness) than the large top gap and the large bottom gap, and may be sized to control the strength of a mutual inductance of the alternate coupled inductor structure. For example, the alternate coupled inductor structure may contain two large gaps (the large top gap and the large bottom gap) and two additional smaller gaps. Alternatively, the alternate coupled inductor structure may contain two large gaps (the large top gap and the large bottom gap) and four additional smaller gaps. The alternate coupled inductor structure may include or use as many gaps in as many locations between the core pieces as desired or suitable for use in a device or circuit in which the alternate coupled inductor is included.

Figure 5A:
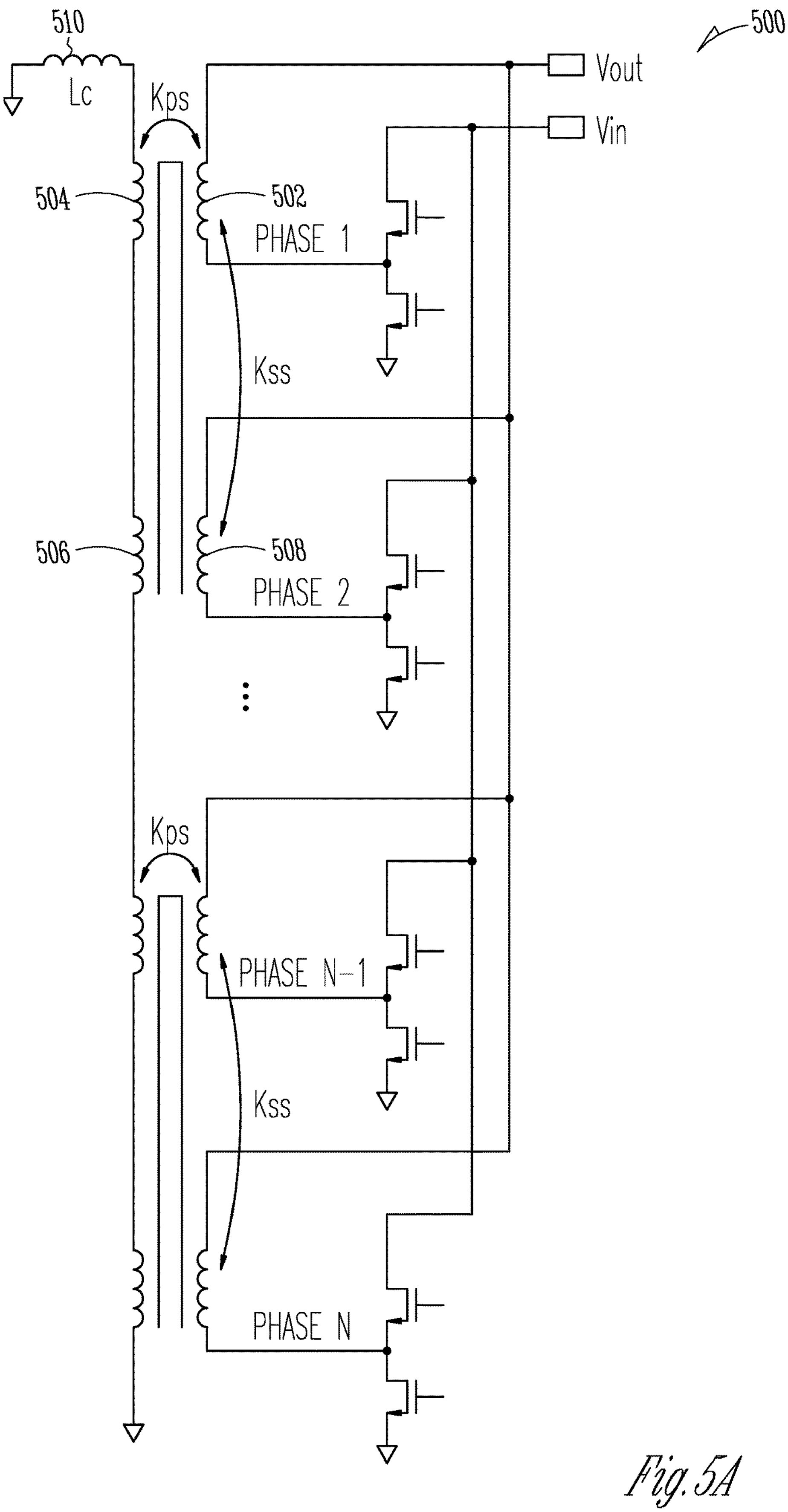
FIG. 5A illustrates an example of a trans-inductor voltage regulator (TLVR) coupled inductor 500 for use in a TLVR power converter.

FIG. 5A illustrates an example of a trans-inductor voltage regulator (TLVR) coupled inductor 500 for use in a TLVR power converter. The TLVR coupled inductor 500 may include multiple phases connected to a primary winding of a transformer. The primary windings may in turn each be coupled to auxiliary secondary windings.

In the example illustrated in FIG. 5A, a first primary winding 502 and a second primary winding 508 may be coupled to a pair of secondary windings. For example, the first primary winding 502 may be coupled to a first secondary winding 504, and the second primary winding 508 may be coupled to a second secondary winding 506. The secondary windings 504 and 506 may be tightly coupled to the primary windings 502 and 508. Thus, the first secondary winding 504 may have a one-to-one turns ratio with the first primary winding 502. Similarly, the second secondary winding 506 may have a one-to-one turns ratio with the second primary winding 508. The first secondary winding 504 and the second secondary winding 506 may be connected to a compensation inductor 510. This may help improve the voltage profile, the power factor, or the transmission capacity or other performance of the power converter.

The TLVR coupled inductor 500 may include as many phases and sets of windings as desired, necessary, or appropriate for the device or component in which it is included. Furthermore, the primary windings may be coupled (as indicated by the arrows connecting the first primary winding 502 and the second primary winding 508, or non-coupled, as desired.

Figure 5B:
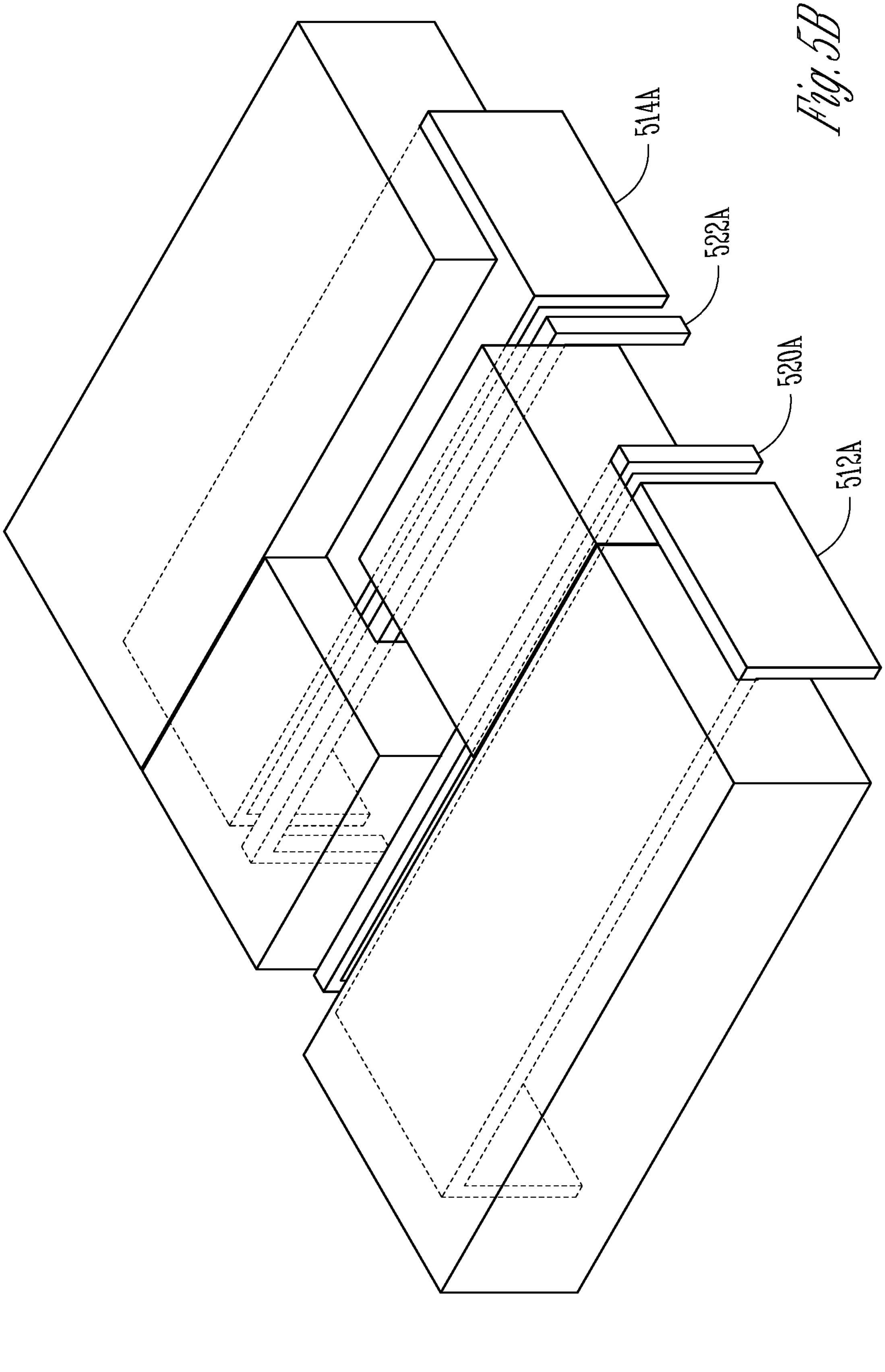
FIG. 5B illustrates the TLVR structure for mounting in a through-hole structure.
Figure 5C:
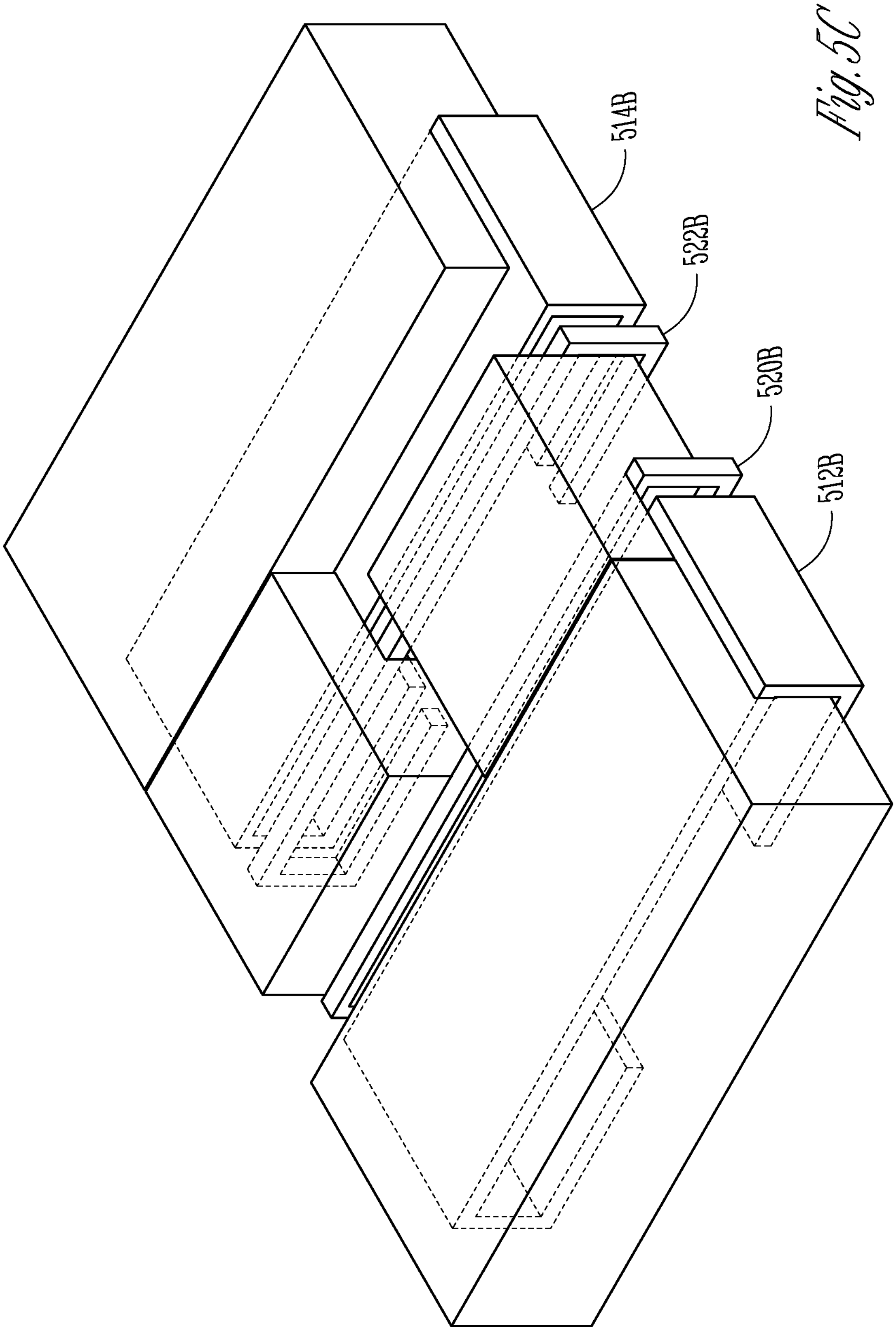
FIG. 5C illustrates the TLVR structure for mounting on a surface mount device.

FIGS. 5B and 5C show different views of an example of a TLVR coupled inductor 500 structure (hereinafter the "TLVR structure"). FIG. 5B illustrates the TLVR structure for mounting in a through-hole structure. FIG. 5C illustrates the TLVR structure for mounting on a surface mount device. The TLVR structures illustrated in FIGS. 5B and 5C may be formed in substantially the same manner described above in FIGS. 2A-2D or as described in FIGS. 4A-4C (e.g., by forming a closed-loop magnetic core structure comprising a first core piece, a second core piece whose first end is attached the second end of the first core piece, a third core piece whose first end is attached to the second end of the second core piece, and a fourth core piece whose first end is attached to the second end of the third core piece, and whose second end is attached to the first end of the first core piece, and locating windings within the closed-loop magnetic core structure).

Therefore, the TLVR structure may include a first winding portion 512A and a second winding portion 514A mounted or located in a coupled inductor structure such as described in FIGS. 2A-2D or the alternate coupled inductor structure such as described in FIGS. 4A-4C. The TLVR structure may further include a third winding portion 520A and a fourth winding portion 522A. In an example, the third winding portion 520A may be located next to, adjacent, proximate to, etc., the first winding portion 512A such that at least part of the third winding portion 520A is substantially parallel to at least part of the first winding portion 512A. Similarly, the fourth winding portion 522A may be located next to, adjacent, proximate to, etc., the second winding portion 514A such that at least part of the fourth winding portion 522A is substantially parallel to at least part of the second winding portion 514A. Furthermore, at least one of the third winding portion 520A or the fourth winding portion 522A may have a one-to-one turns ratio with the first winding portion 512A or the second winding portion 514A.

FIGS. 5B and 5C illustrate that the terminals of the windings of the TLVR structure may be located such as to extend from the sides of the TLVR structure. For example, terminal ends of the first winding portion 512A, the second winding portion 514A, the third winding portion 520A, and the fourth winding portion 522A may be located on the sides of the TLVR structure such that two or more switch node terminals (e.g., $SW_1$ and $SW_2$ discussed above) may be located on one side of the TLVR structure, and two or more output voltage terminals (e.g., $V_{OUT1}$ and $V_{OUT2}$ discussed above) may be located on the other side of the TLVR structure opposite the switch node terminals. As shown in FIG. 5C any of the winding terminals 512B, 520B, 522B, or 514B may be bent such as to enable the TLVR structure to be assembled in a surface mount device.

Figure 6:
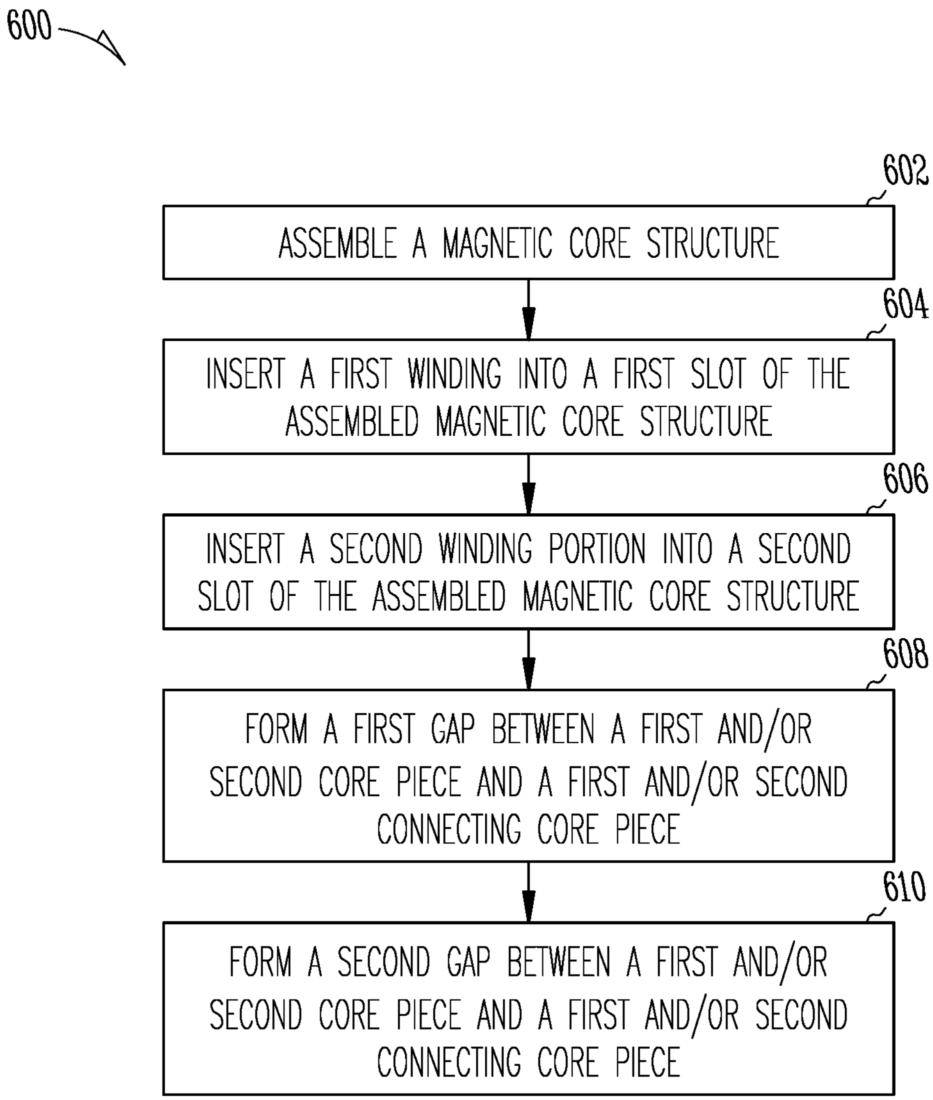
FIG. 6 is an example of a flowchart illustrating portions of a method 600 of fabricating a coupled inductor structure.

FIG. 6 is an example of a flowchart illustrating portions of a method 600 of fabricating a coupled inductor structure. The method 600 may include a series of operations or steps that may be utilized to perform the method 600. At 602, a magnetic core structure may be assembled. The assembling of the magnetic core structure may include providing an at least partially cross-sectionally U-shaped first core piece and an at least partially cross-sectionally U-shaped second core piece (hereinafter "the core pieces"). The assembling may further include attaching a first portion of a first connecting core piece to a first portion of the first core piece and attaching a second portion of the first connecting core piece to a first portion of the second core piece. Similarly, the assembling may include attaching a first portion of a second connecting core piece to a second portion of the first core piece and attaching a second portion of the second connecting core piece to a second portion of the second core piece. Thus, the first connecting core piece may attach a first portion of the first core piece to a first portion of the second core piece, and the second connecting core piece may attach a second portion of the first core piece to a second portion of the second core piece.

In an example, the first connecting core piece and/or the second connecting core piece may be a step structure (or a cross-sectionally Z-shape). Additionally, or alternatively, the first connecting core piece and/or the second connecting core piece may be a block structure. The core pieces may be formed from a ferromagnetic material such as iron, ferrite, or any similar material.

At 604, a first winding portion may be inserted into a first slot of the assembled magnetic core structure formed between the first core piece, the first connecting core piece, and the second connecting core piece. At 606, a second winding portion may be inserted into a second slot of the assembled magnetic core structure formed between the second core piece, the first connecting core piece, and the second connecting core piece. In an example, at least a portion of the first slot and/or the second slot may be a slit or cut out portion in the first core piece and the second core piece to give the core pieces their cross-sectional U-Shape.

The first winding portion and/or the second winding portion may include a staple winding (or a similar flattened electrical conductor) that spans across a width of the assembled magnetic core structure so that the first winding portion and the second winding portion are substantially parallel to each other. In an example, a first switch node terminal and a second switch node terminal may be formed by terminal ends of the first winding portion and the second winding portion on a first side of the assembled magnetic core structure. Additionally, a first output voltage terminal and a second output voltage terminal may be formed by the terminal windings of the first winding portion and the second winding portion on a second side of the magnetic core structure opposite the first side.

At 608 a first gap to control leakage inductance of the coupled inductor structure between at least one of the first connecting core piece or the second connecting core piece and at least one of the first core piece or the second core piece may be formed. At 610 a second gap to control mutual inductance of the coupled inductor structure between at least one of the first connecting core piece or the second connecting core piece and at least one of the first core piece or the second core piece may be formed. The first gap may span an entire width of the magnetic core structure, and the second gap may span approximately half the width of the magnetic core structure. In an example, the first gap may be wider or larger than the second gap.

Any of the gaps may be filled with materials such as air, glue, epoxy, paper, plastics, or any other material with a permeability close to air. When a relatively large inductance (end thus a smaller gap size) is required for the coupled inductor design, the gaps may be filled with low-permeability magnetic material, which may increase the gap length and make the gap reluctance (and therefore the inductance) less sensitive to manufacturing tolerances.

At least one of the first winding portion or the second winding portion (or a part of each of the winding portions) may be electromagnetically shielded by the core pieces to reduce electromagnetic interference or noise. Additionally, or alternatively, an outer surface of at least one of the first magnetic core piece or the second magnetic core piece (e.g., a top surface or a bottom surface of the fully assembled structure) may be flat to allow the structure to maintain a smaller profile or height when compared to the dimensions of larger inductor structures while maintaining a higher inverse coupling and higher saturation current than other inductor structures.

Additional Notes and Examples

Example 1 is a device including an inverse-coupled inductor, comprising: a first winding portion; a second winding portion; and a magnetic core structure comprising: an at least partially cross-sectionally U-shaped first core piece; an at least partially cross-sectionally U-shaped second core piece; a first connecting core piece, attaching a first portion of the first core piece to a first portion of the second core piece; and a second connecting core piece, attaching a second portion of the first core piece to a second portion of the second core piece.

In Example 2, the subject matter of Example 1 optionally includes wherein the first winding portion is located in a first slot in the magnetic core structure formed between the attached first core piece, the first connecting core piece, and the second connecting core piece, and wherein the second winding portion is located in a second slot in the magnetic core structure formed between the attached second core piece, the first connecting core piece, and the second connecting core piece, and wherein at least one of the first connecting core piece or the second connecting core piece is step structure or a block structure.

In Example 3, the subject matter of Example 2 optionally includes wherein the first winding portion and the second winding portion respectively include a staple winding and span across a width of the magnetic core structure so that the first winding portion and the second winding portion are substantially parallel to each other.

In Example 4, the subject matter of any one or more of Examples 1-3 optionally include a first switch node terminal and a second switch node terminal located on a first side of the magnetic core structure; and a first output voltage terminal and a second output voltage terminal located on a second side of the magnetic core structure opposite the first side.

In Example 5, the subject matter of any one or more of Examples 1-4 optionally include a first gap, to control leakage inductance of the inverse-coupled inductor, formed between at least one of the first connecting core piece or the second connecting core piece and at least one of the first core piece or the second core piece.

In Example 6, the subject matter of Example 5 optionally includes a second gap, to control mutual inductance of the inverse-coupled inductor, formed between at least one of the first connecting core piece or the second connecting core piece and at least one of the first core piece or the second core piece.

In Example 7, the subject matter of Example 6 optionally includes wherein a width of the first gap is larger than a width of the second gap.

In Example 8, the subject matter of any one or more of Examples 6-7 optionally include wherein the first gap spans an entire width of the magnetic core structure and wherein the second gap spans approximately half the width of the magnetic core structure.

In Example 9, the subject matter of any one or more of Examples 1-8 optionally include wherein a portion of the first winding portion or a portion of the second winding portion are bent to form a shape corresponding to at least one of a through-hole package or a surface mount device package.

In Example 10, the subject matter of any one or more of Examples 1-9 optionally include wherein at least a portion of at least one of the first winding portion or the second winding portion is electromagnetically shielded by the magnetic core structure to reduce electromagnetic interference or noise.

Example 11 is a method of fabricating a magnetic core structure, the method comprising: assembling the magnetic core structure, the assembling comprising: providing an at least partially cross-sectionally U-shaped first core piece; providing an at least partially cross-sectionally U-shaped second core piece; attaching a first portion of a first connecting core piece to a first portion of the first core piece; attaching a second portion of the first connecting core piece to a first portion of the second core piece; attaching a first portion of a second connecting core piece to a second portion of the first core piece; attaching a second portion of the second connecting core piece to a second portion of the second core piece; inserting a first winding portion in a first slot of the assembled magnetic core structure formed between the first core piece, the first connecting core piece, and the second connecting core piece; and inserting a second winding portion in a second slot of the assembled magnetic core structure formed between the second core piece, the first connecting core piece, and the second connecting core piece.

In Example 12, the subject matter of Example 11 optionally includes wherein the first winding portion and the second winding portion respectively include a staple winding and span across a width of the assembled magnetic core structure so that the first winding portion and the second winding portion are substantially parallel to each other.

In Example 13, the subject matter of any one or more of Examples 11-12 optionally include locating a first switch node terminal and a second switch node terminal on a first side of the assembled magnetic core structure; and locating a first output voltage terminal and a second output voltage terminal on a second side of the assembled magnetic core structure opposite the first side.

In Example 14, the subject matter of any one or more of Examples 11-13 optionally include forming a first gap to control leakage inductance of the assembled magnetic core structure between at least one of the first connecting core piece or the second connecting core piece and at least one of the first core piece or the second core piece; and forming a second gap to control mutual inductance of the assembled magnetic core structure between at least one of the first connecting core piece or the second connecting core piece and at least one of the first core piece or the second core piece.

In Example 15, the subject matter of Example 14 optionally includes wherein a width of the first gap is wider than a width of the second gap.

In Example 16, the subject matter of any one or more of Examples 14-15 optionally include wherein the first gap spans an entire width of the assembled magnetic core structure and wherein the second gap spans approximately half the width of the magnetic core structure.

In Example 17, the subject matter of any one or more of Examples 11-16 optionally include bending at least a portion of the first winding portion or the second winding portion to form a shape corresponding to at least one of a through-hole package or a surface mount device package.

Example 18 is a Trans-Inductor Voltage Regulator (TLVR) circuit, comprising: a first winding portion; a second winding portion; a third winding portion; a fourth winding portion; and a closed-loop magnetic core structure.

In Example 19, the subject matter of Example 18 optionally includes wherein the closed-loop magnetic core structure comprises: an at least partially cross-sectionally U-shaped first core piece; an at least partially cross-sectionally U-shaped second core piece; a first connecting core piece, wherein a first portion of the first connecting core piece is attached to a first portion of the first core piece, and a second portion of the first connecting core piece is attached to a first portion of the second core piece; and a second connecting core piece, wherein a first portion of the second connecting core piece is attached to a second portion of the first core piece and a second portion of the second connecting core piece is attached to a second portion of the second core piece.

In Example 20, the subject matter of Example 19 optionally includes wherein the first winding portion and the third winding portion are inserted into a first slot in the magnetic core structure formed between the attached first core piece, the first connecting core piece and the second connecting core piece, and wherein the second winding portion and the fourth winding portion are inserted into a second slot in the magnetic core structure formed between the attached second core piece, the first connecting core piece, and the second connecting core piece, wherein the first winding portion, the second winding portion, the third winding portion and the fourth winding portion are parallel to each other, wherein the first winding portion and the second winding portion are included in primary side windings, wherein the third winding portion and the fourth winding portion are included in secondary side windings, and wherein at least one of the third winding portion or the fourth winding portion has a one-to-one turns ratio with the first winding portion or the second winding portion.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device including an inverse-coupled inductor, comprising:

a first winding portion;

a second winding portion; and a magnetic core structure comprising:

an at least partially cross-sectionally U-shaped first core piece;

an at least partially cross-sectionally U-shaped second core piece;

a first connecting core piece, including a first feature configured for attaching a first portion of the first core piece to a first portion of the second core piece; and a second connecting core piece, formed as a discrete component different from the first connecting core piece, including a second feature configured for attaching a second portion of the first core piece to a second portion of the second core piece, wherein:

the first winding portion is located in a first slot in the magnetic core structure formed between the attached first core piece, the first connecting core piece, and the second connecting core piece;

the second winding portion is located in a second slot in the magnetic core structure formed between the attached second core piece, the first connecting core piece, and the second connecting core piece;

the first connecting core piece attaches a lower portion of the first core piece to an upper portion of the second core piece;

the second connecting core piece attaches an upper portion of the first core piece to a lower portion of the second core piece; and each of the first connecting core piece and the second connecting core piece includes a step structure.

2. The device of claim 1, wherein the first winding portion and the second winding portion respectively include a staple winding and span across a width of the magnetic core structure so that the first winding portion and the second winding portion are substantially parallel to each other.

3. The device of claim 1, further comprising:

a first switch node terminal and a second switch node terminal located on a first side of the magnetic core structure; and a first output voltage terminal and a second output voltage terminal located on a second side of the magnetic core structure opposite the first side.

4. The device of claim 1, further comprising:

a first gap, to control leakage inductance of the inverse-coupled inductor, formed between at least one of the first connecting core piece or the second connecting core piece and at least one of the first core piece or the second core piece.

5. The device of claim 4, further comprising:

a second gap, to control mutual inductance of the inverse-coupled inductor, formed between at least one of the first connecting core piece or the second connecting core piece and at least one of the first core piece or the second core piece.

6. The device of claim 5, wherein a width of the first gap is larger than a width of the second gap.

7. The device of claim 5, wherein the first gap spans an entire width of the magnetic core structure and wherein the second gap spans approximately half the width of the magnetic core structure.

8. The device of claim 1, wherein a portion of the first winding portion or a portion of the second winding portion are bent to form a shape corresponding to at least one of a through-hole package or a surface mount device package.

9. The device of claim 1, wherein at least a portion of at least one of the first winding portion or the second winding portion is electromagnetically shielded by the magnetic core structure to reduce electromagnetic interference or noise.

10. A Trans-Inductor Voltage Regulator (TLVR) circuit, comprising:

a first winding portion;

a second winding portion;

a third winding portion;

a fourth winding portion; and a closed-loop magnetic core structure comprising an at least partially cross-sectionally U-shaped first core piece;

an at least partially cross-sectionally U-shaped second core piece;

a first connecting core piece, including a first feature configured for attaching a first portion of the first core piece to a first portion of the second core piece; and a second connecting core piece, formed as a discrete component different from the first connecting core piece, including a second feature configured for attaching a second portion of the first core piece to a second portion of the second core piece, wherein:

a first portion of the first connecting core piece is attached to a first portion of the first core piece, and a second portion of the first connecting core piece is attached to a first portion of the second core piece;

the first connecting core piece attaches a lower portion of the first core piece to an upper portion of the second core piece;

a first portion of the second connecting core piece is attached to a second portion of the first core piece and a second portion of the second connecting core piece is attached to a second portion of the second core piece;

the second connecting core piece attaches an upper portion of the first core piece to a lower portion of the second core piece; and each of the first connecting core piece and the second connecting core piece includes a step structure.

11. The TLVR circuit of claim 10, wherein the first winding portion and the third winding portion are inserted into a first slot in the magnetic core structure formed between the attached first core piece, the first connecting core piece and the second connecting core piece, and wherein the second winding portion and the fourth winding portion are inserted into a second slot in the magnetic core structure formed between the attached second core piece, the first connecting core piece, and the second connecting core piece, wherein the first winding portion, the second winding portion, the third winding portion and the fourth winding portion are parallel to each other, wherein the first winding portion and the second winding portion are included in primary side windings, wherein the third winding portion and the fourth winding portion are included in secondary side windings, and wherein at least one of the third winding portion or the fourth winding portion has a one-to-one turns ratio with the first winding portion or the second winding portion.

* * * * *